Nov. 17, 1970 — J. B. GILL — 3,540,329

PIPE MACHINING TOOL

Filed Feb. 11, 1969 — 7 Sheets-Sheet 1

INVENTOR
JOHN B. GILL

BY

Bechler + Arant
ATTORNEYS

Nov. 17, 1970　　　　　　　　　J. B. GILL　　　　　　　　　3,540,329
PIPE MACHINING TOOL

Filed Feb. 11, 1969　　　　　　　　　　　　　　　　　　7 Sheets-Sheet 4

INVENTOR
JOHN B. GILL
BY
Bechler + Arant
ATTORNEYS

Nov. 17, 1970   J. B. GILL   3,540,329

PIPE MACHINING TOOL

Filed Feb. 11, 1969   7 Sheets-Sheet 7

INVENTOR
JOHN B. GILL

BY
Beehler & Arant
ATTORNEYS

United States Patent Office 3,540,329
Patented Nov. 17, 1970

3,540,329
PIPE MACHINING TOOL
John B. Gill, Redondo Beach, Calif., assignor to
Sanford E. Coblitz, Ashtabula, Ohio
Filed Feb. 11, 1969, Ser. No. 798,361
Int. Cl. B23b 5/16
U.S. Cl. 82—4                                   11 Claims

ABSTRACT OF THE DISCLOSURE

A pipe machining tool including an arbor assembly that is inserted into the end of a pipe and then expanded in order to support an arbor shaft which projects outwardly from the pipe end; a turning frame assembly rotatably supported from the projecting portion of the arbor shaft adjacent the pipe end; a trimmer tool assembly supported from the turning frame assembly for cutting, trimming, and/or squaring the end of the pipe; a machining tool assembly supported from the turning frame assembly for machining a bevel and tenons on the outer surface of the pipe end; and a screw feed assembly attached to the outer end of the arbor shaft and cooperating with the turning frame assembly so that the tools may be progressively driven toward the pipe in response to rotation of the turniing frame assembly.

BACKGROUND OF THE INVENTION

The present invention provides various improvements over the pipe machining tools shown in United States Pats. Nos. 2,607,376 and 2,916,955. Such a pipe tool is generally referred to as a field lathe, and is used in the field for preparing the ends of asbestos-cement pipe for joining the precise joints.

The complete tool includes an arbor assembly having a protruding arbor shaft, the arbor assembly being inserted into the interior of the end of the pipe and being centered therein and then expanded so as to support the arbor shaft in a precisely centered position so that it will extend outward from the end of the pipe and concentric with the longitudinal center of the pipe. A turning frame assembly is rotatably supported on the portion of the arbor shaft that protrudes from the pipe end, and this turning frame assembly is rotated either by hand or by a power drive in order to drive the tools that are mounted on it. Two separate tools are generally provided, one being a trimming tool and the other being a machining tool, and they are used alternately rather than concurrently. The trimming tool may be used to square the end surface of the pipe, or to cut off a small amount of the length of the pipe on a circumferential line in order to achieve a precise pipe length that is desired, or to reduce the exterior surface adjacent the pipe end to a true cylindrical configuration. The machining tool may be used for machining a bevel and two tenons on the exterior pipe surface, or in some instances a bevel and a single tenon.

One of the mechanical requirements of the turning frame assembly is that two separate bearings must be provided for its rotatable support. The wear and replacement of these bearings has proven to be a problem of some importance.

As shown in Pat. No. 2,916,955 it is desirable to provide a screw feed mechanism for driving the tools forward against the pipe by rotating the turning frame assembly. The wear and necessary maintenance of the screw feed mechanism has also proved to be a problem of some importance.

Experience has also shown that the alternate use of the machining tool and the trimming tool involves considerable inconvenience in re-setting the machining tool to its desired position.

One object of the invention is to provide an improved pipe machining tool.

A further, additional, and independent object, which is unrelated to the foregoing object, is to provide an improved screw feed mechanism.

PREFERRED EMBODIMENT

In the drawings my new pipe machine tool is seen used in conjunction with a pipe A, typically made of asbestos-cement material. The tool includes an arbor assembly B which is made generally in accordance with U.S. Pats. Nos. 2,607,376; 3,216,295; 3,222,960; and 3,234,826. Specifically, the arbor assembly B includes an elongated arbor shaft 20 on one end of which the center pieces 24, 25 are carried. Three pairs of fingers 26, 27 project outward from the center pieces and have channel bars 28 attached to their outer ends. When the arbor assembly is inserted inside the interior of the end of pipe A, the arbor shaft 20 is rotated inorder to expand the arbor until channel bars 28 firmly engage the interior wall of the pipe. The arbor shaft 20 is then firmly supported, in a center position in which it is substantially concentric with the longitudinal axis of the pipe, and the greater portion of the shaft 20 extends outwardly from the end of the pipe.

The pipe tool also includes a turning frame assembly generally designated as C, which is rotatably supported from the projecting portion of arbor shaft 20. The basic component of turning frame assembly C is a center casting 30 having various openings and slideways formed therein for insertion and attachment of the other related parts. Arbor shaft 20 passes through a central opening in the center casting 30, and on the forward side of the casting, adjacent the end of pipe A, there is a removable center bearing 35 which is retained in place by a pin 36 and ring 37. A hub casting 40 is also a basic part of the turning frame assembly C, although as will later be described it is additionally a part of the screw feed assembly F. The hub casting 40 is of a generally hollow cylindrical configuration having one end inserted into the central opening of casting 30 on its rearward side, being retained in rigid relationship to the casting 30 by means of epoxy cement. The arbor shaft 20 is of sufficient length so that it extends through and beyond the interior of hub casting 40, so that the outer end of arbor shaft 20 also may function as a part of the screw feed assembly F.

The center casting 30 of the turning frame assembly rotates in a plane that is perpendicular to the axis of arbor shaft 20, and it includes a pair of elongated oppositely directed arms having respective slideways in which tool mounting blocks 50, 50a are engaged. These blocks support the trimming tool D and machining tool E, respectively.

Thus the mounting block 50 together with associated studs 51 and mounting bolt 52 supports frame member 70 of the trimmer tool assembly D. Trimmer blade 71 extends inwardly from the remote-end of frame member 70, projecting toward the outer surface of pipe A, with the depth setting of the blade being adjusted by blade feed screw 72. When the trimmer is used to cut the outer surface of the pipe to precisely cylindrical shape, a set screw 73 is used to maintain a fixed depth of blade 71. The radial distance of frame member 70 and its associated mounting block 50 from the arbor shaft is controlled by adjusting screw 60. Adjusting screw 60 has a threaded shank which extends through a transverse threaded opening in the plug 61, which plug is received by a transverse opening at the remote end of the corresponding arm of frame casting 30 and acts as an adjusting screw bearing for the adjusting screw 60. The inner end of adjusting screw 60 is rotatably attached to the mounting block 50. Adjusting screw 60 is provided with a handle 62 at its outer end, and rotation of this handle therefore causes the mounting block 50 to move radially inward or radially outward, in its associated slideway in the center casting 30.

In similar fashion the mounting block 50a with its associated studs 51a and mounting bolt 52a supports the frame member 80 of machining tool assembly E. A beveling blade 81 extends inward from frame member 80 near the turning frame assembly, and machining blades 82, 83 are attached at more remote points, machining blade 83 being near the remote end of frame member 80. The tool adjusting screw 60a, with its adjusting screw bearing 61a and handle 62a, operates in the same manner as adjusting screw 60.

Figures 1, 11, 12:
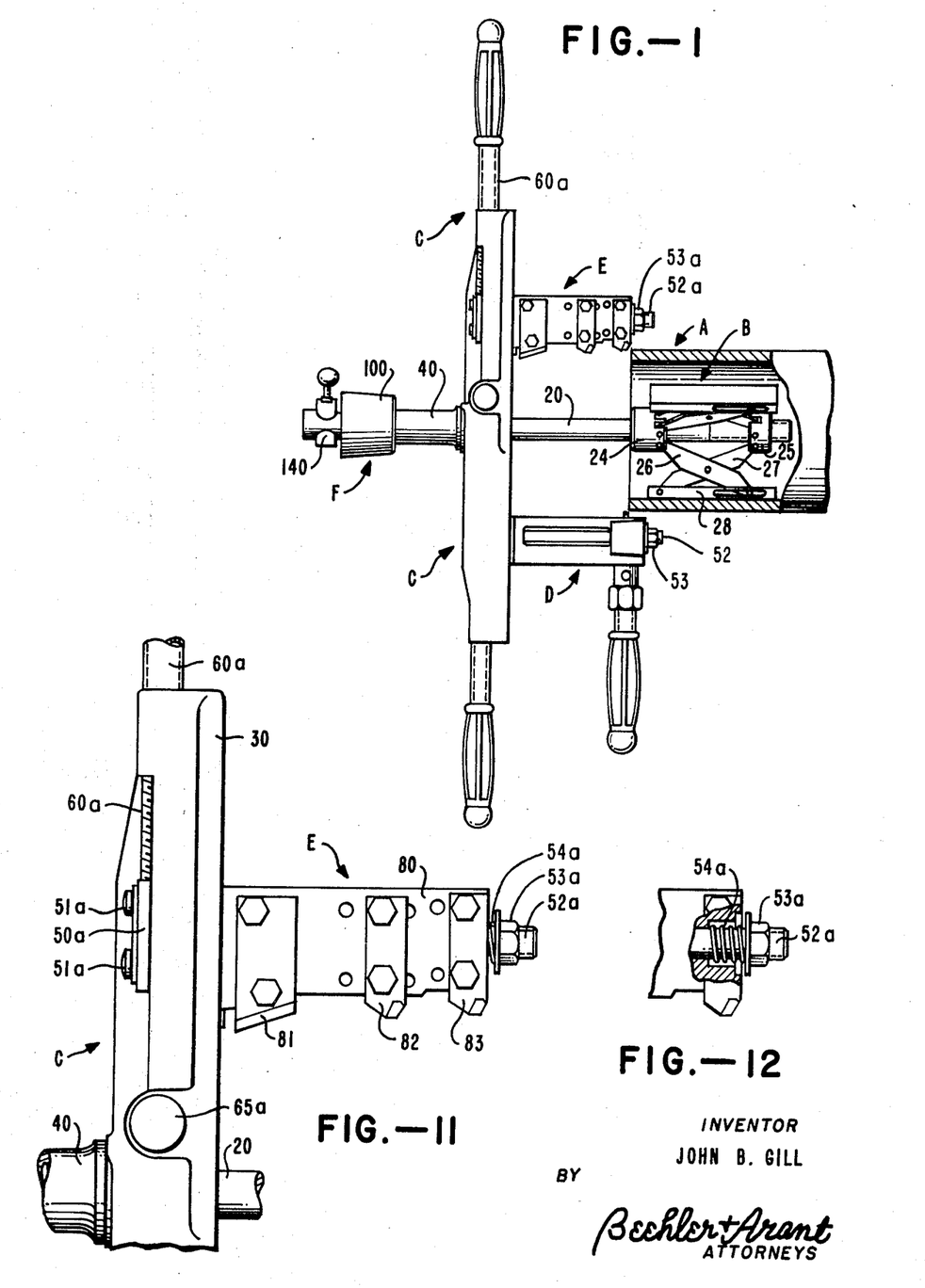
FIG. 1 is a side elevation view, partially in cross-section, of the pipe machining tool supported from the end of a pipe.
FIG. 11 is an elevational view showing the oppoiste side of the machining tool assembly.
FIG. 12 is a fragmentary cross-sectional view of an interior detail of the machining tool assembly.

As specifically shown in FIGS. 11 and 12, the mounting bolt 52a which supports frame member 80 of machining tool assembly E has a nut 53a on its outer end. The nut 53a carries a flange for retaining a spring 54a, and a recess is formed in the exterior end of frame member 80 (see FIG. 12) within which the spring 54a is received. During a machining operation the nut 53a is tightened against the outer end of frame member 80, and occupies the position shown in FIG. 1. Whenever the radial position of the machining tool assembly is to be changed, however, it is necessary to loosen the grasp of the mounting block 50a and the frame member 80 on the turning frame. The nut 53a is therefore loosened. The expansive force of spring 54a applied between nut 53a and the shoulder on the interior chamber of frame member 80 provides a firm support, but still permits sliding movement of the block 50a and frame member 80 along the radial arm of the turning frame. This condition is shown in FIG. 11, where adjusting screw 60a may be used to adjust the radial position of the machining tool assembly.

Figures 2, 10:
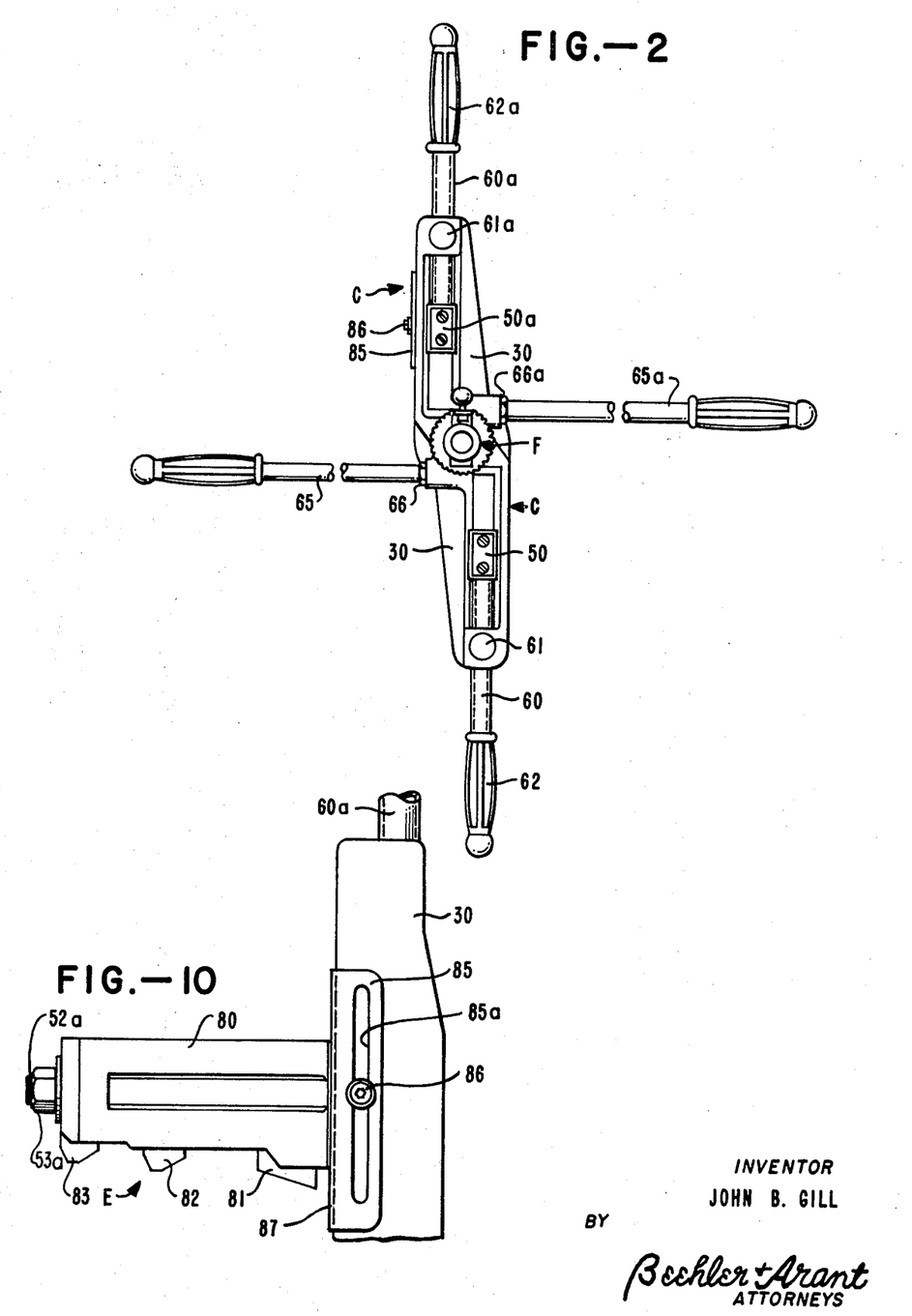
FIG. 2 is an elevation view of the tool taken from its outer end.
FIG. 10 is an elevation view of the machining tool assembly from its left side as seen in FIG. 2.

In FIG. 10 the bolt 52a, which should extend considerably beyond the nut 53a as shown in FIG. 1, is shortened for lack of space only.

For radial adjustment of the trimmer tool assembly D the nut 53 is loosened in the same manner, and a spring 54 (not specifically shown) supports the frame member 70 and mounting block 50 in a sliding relationship to the radial arm of the center casting 30. After adjusting screw 60 has been used to establish the radial position, the nut 53 is again tightened.

The turning frame assembly also includes a pair of auxiliary turning handles 65, 65a which are disposed perpendicular to the handles 62, 62a. Each of the auxiliary handles has a threaded inner end that is received in a corresponding threaded opening in the center casting 30, and then held in place by one of the associated jam nuts 66, 66a. The auxiliary handles 65, 65a are removed when the turning frame assembly is rotated by mean of a power drive, rather than manually.

Figure 9:
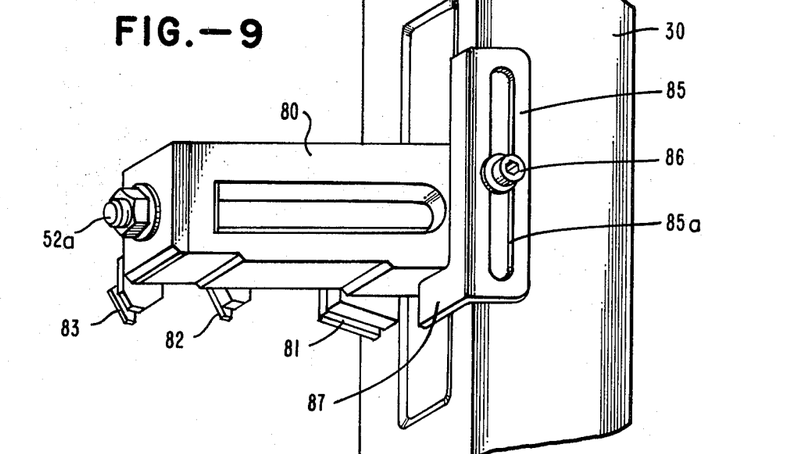
FIG. 9 is an enlarged perspective view of the machining tool assembly and its adjustable stop.
Figure 15:
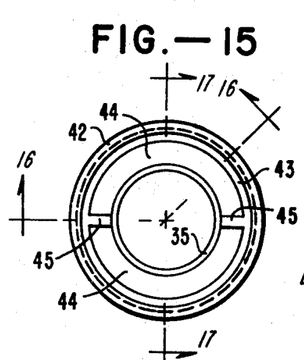
FIG. 15 is an end view of the hub casting showing the collet jaw chamber.
Figure 16:
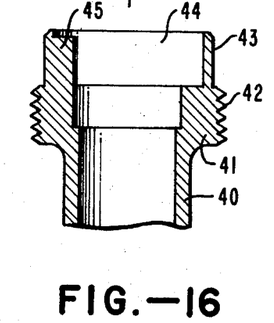
FIG. 16 is a cross-sectional view of the hub casting taken on the line 16—16 of FIG. 15.
Figure 17:
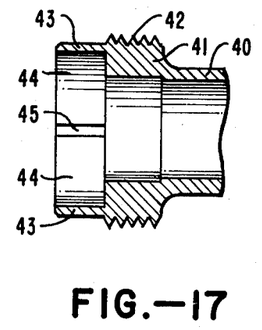
FIG. 17 is a cross-sectional view of the hub casting taken on the line 17—17 of FIG. 15.

Another significant part of the machining tool assembly E is the machining tool stop 85 with its associated stop screw 86. The stop 85 is an elongated generally L-shaped plate, having one side flange whose end forms a hook 87 adjacent the inner end of frame member 80. The other flange of the stop 85 (fully exposed in FIGS. 9 and 10) is then in engagement with a flat outer surface of the center casting 30. Stop screw 86 is positioned in longitudinal slot 85a of the stop member, and occupies a fixed position which is approximately in the longitudinal center of the associated arm of casting 30. The hook end 87 of stop member 85 limits the radial inward travel of the frame member 80. So the screw 86 is tightened for a particular desired location of the frame member 80, then the frame member 80 can be retracted upward or outward so as to get it out of the way and permit the use of the trimming tool. After the trimming tool has been used the frame member 80 can be returned to its original position without having to make any new measurements and without changing the location of stop member 85 or its stop screw 86.

The screw feed assembly F is the other main assembly of the pipe machining tool. Hub casting 40 at its outer end is enlarged at 41 having its external surface threaded at 42. Beyond the threads 42 the extremity of hub 40 has the configuration of a thin-walled cylinder 43. Threads 42 project outward beyond the outer wall surface of cylinder 43. Cylinder 43 on its inner wall has a pair of diametrically opposite septa, or partial ribs, 45. These septa divide the inner circumferential area of the chamber 43 into a pair of collet chambers 44 each constituting slightly less than one hundred eighty degrees of annular space inside the cylinder 43. A matched pair of collet jaws 110, 111 occupy respective collet chambers 44.

Figures 8, 13, 14:
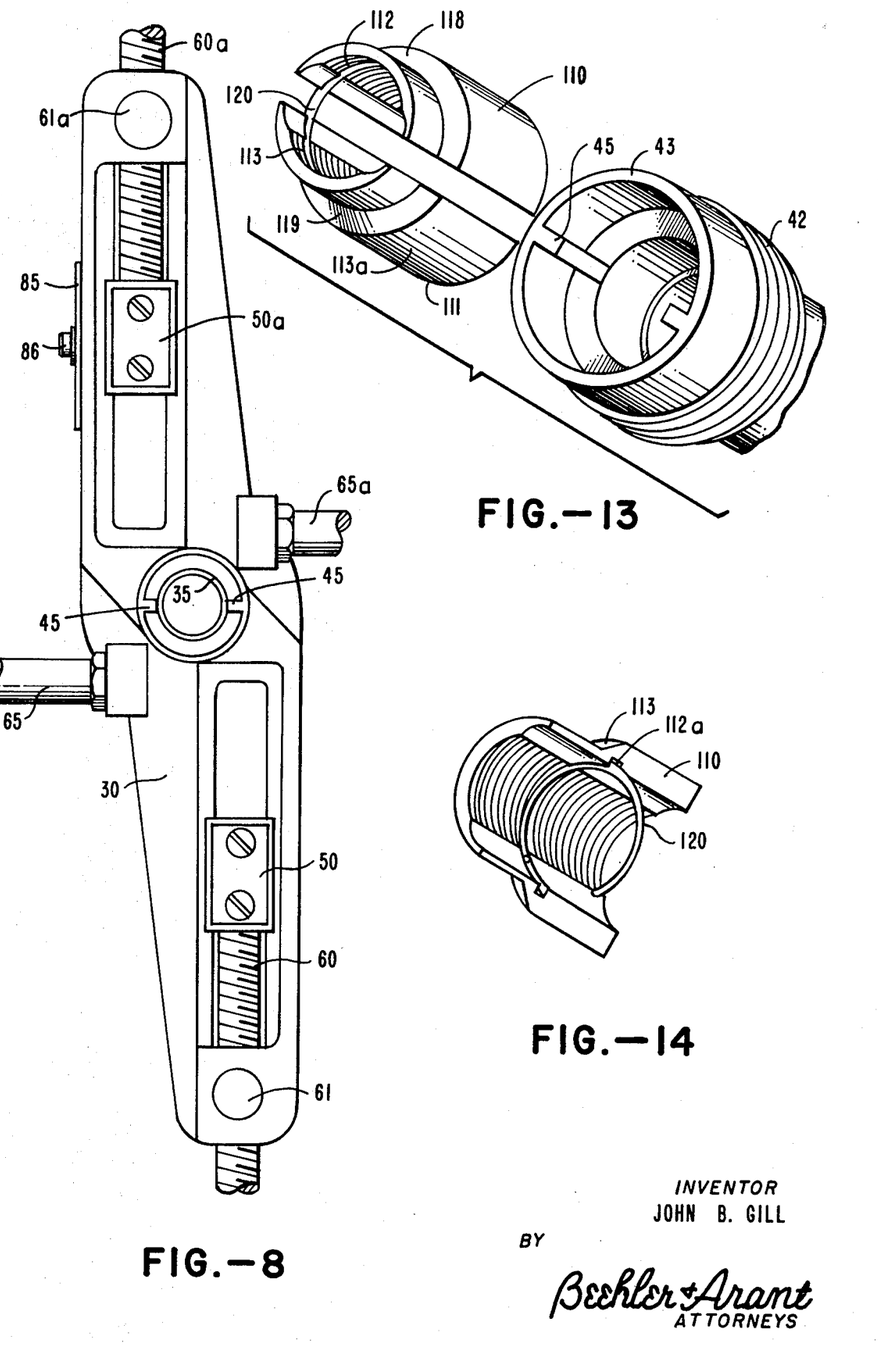
FIG. 8 is an enlarged fragmentary view like FIG. 2, but showing only the turning frame with the arbor shaft and screw feed assembly removed.
FIG. 13 is an enlarged exploded isometric view of the collet jaws of the screw feed assembly, and the hub end of which they are received.
FIG. 14 is an isometric view of one of the collet jaws showing also the collet spring.

Assembly F also includes a generally cylindrical collet nut 100. The nut 100 has interior threads 101 at one end which engage the threads 42 of hub 40. At its other interior end it has a cam surface 102 extending circumferentially around the interior opening of the collet nut, whose function is to force the collet jaws 110, 111 into their proper positions. As seen in FIGS. 13 and 14 the collet jaws have circumferential interior grooves 112, 113a which receive the collet spring 120. Spring 120 tends to expand the collet jaws, while the cam 102 of collet nut 100 tends to force them together against the effect of the spring.

Another important element of the screw feed assembly F is the feed tube or sleeve 130 which is threaded on its exterior surface throughout the exposed portion of its length. Sleeve 130 has an interior diameter such that it makes a fairly snug fit over the outer end of the arbor shaft 20, and may be slid over the outer end of the arbor shaft very easily but without undue play. The inner end of sleeve 130, that projects towards or adjacent to the turning frame casting 30, is not in any way attached to that casting, but floats free of it at all times. The extreme outer end of sleeve 130 (FIGS. 5, 21) is not threaded and has an end casting 140 fitted around it. The end casting 140 and sleeve 130 are rigidly secured together by epoxy glue. The collet jaws 110, 111 have interior threads (FIG. 13) which engage the exterior threads of the sleeve or tube 130.

Figure 5:
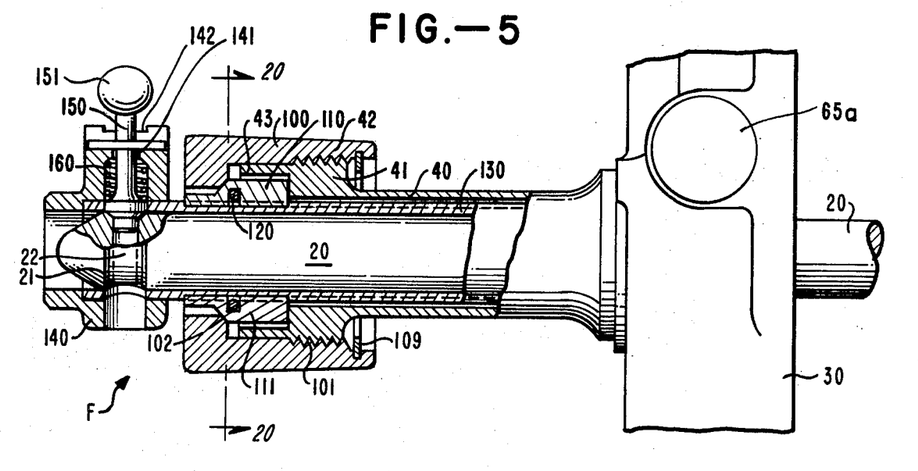
FIG. 5 is a longitudinal cross-sectional view of the outer end of the tool showing details of the screw feed assembly with the collet jaws closed.
Figures 21, 22, 23, 25:
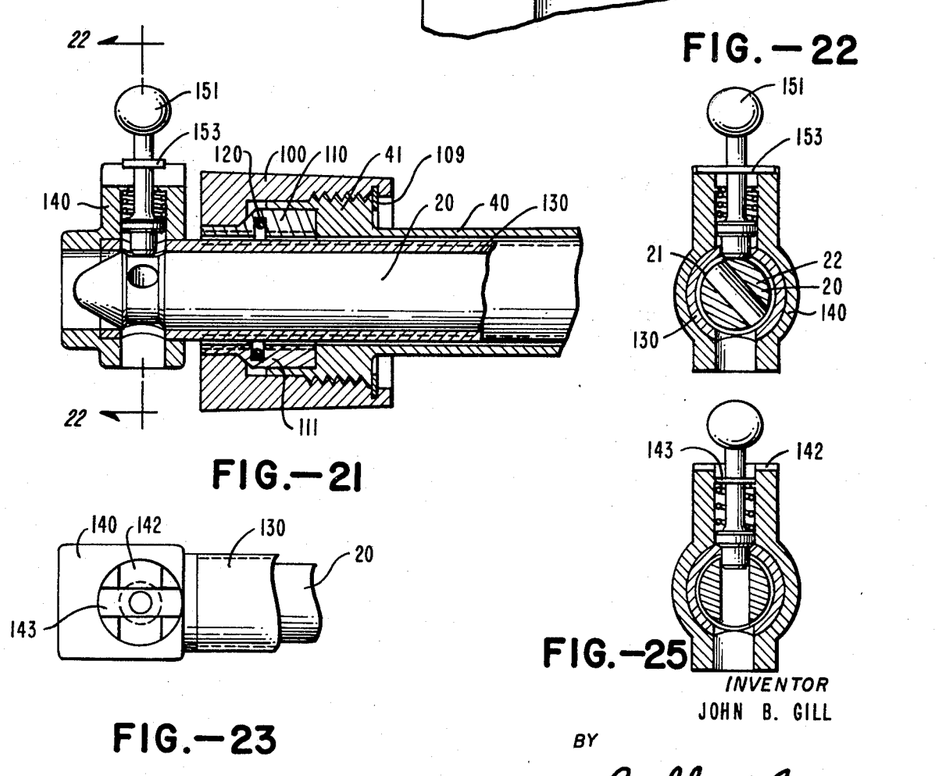
FIG. 21 is a view of the screw feed assembly like FIG. 5, but showing the collet jaws open, and the lock pin raised.
FIG. 22 is a cross-sectional view of the end casting and lock pin taken on the line 22—22 of FIG. 21.
FIG. 23 is a top plan view of the end casting and lock pin.
FIG. 25 is a cross-sectional view of the end casting showing the lock pin in its locked position.

End casting 140 has an enlarged portion on its upper side (as seen in FIGS. 5 and 21) into which a lock pin 150 is radially inserted through a corresponding pin chamber 141. On its outer end the lock pin 150 has a knob 151. The enlarged inner end 152 of pin 150 forms a seat for retaining spring 160, whose outer end is retained by the wall of casting 140, so as to urge lock pin 150 inward at all times toward the arbor shaft 20.

Arbor shaft 20 adjacent its extreme outer end has a circumferential groove 21 formed in its outer surface, in which the inner end of lock pin 150 sometimes rides (FIG. 22). There is also a transverse hole or opening 22 which extends through the arbor shaft 20, at the bottom of groove 21.

The outer end of lock pin 150 is also provided with a cross bar 153. The end casting 140 is provided with a pair of shallow slots 142 (FIG. 23) in which the cross bar 153 seats for engagement of the pin with groove 21 as shown in FIGS. 21 and 22. The end casting also has a pair of deep slots 143 which the cross bar 153 seats for engagement of pin 150 with hole 22 (FIGS. 5, 25). When the shallow slots are used the inner end of the lock pin projects inward approximately 1/64 inch from the interior of sleeve 130, and extends into the arbor shaft groove 21 to that extent. Sleeve 130 and its associated end casting 140, lock pin 150 and spring 160, are then free to rotate as a single unit relative to the arbor shaft 20. When the cross bar 153 is seated in the deep slots, and the inner end of lock pin 150 occupies the hole or opening 22 of the arbor shaft, the feed tube 130 is then locked against rotation relative to the arbor shaft 20.

Figure 3:
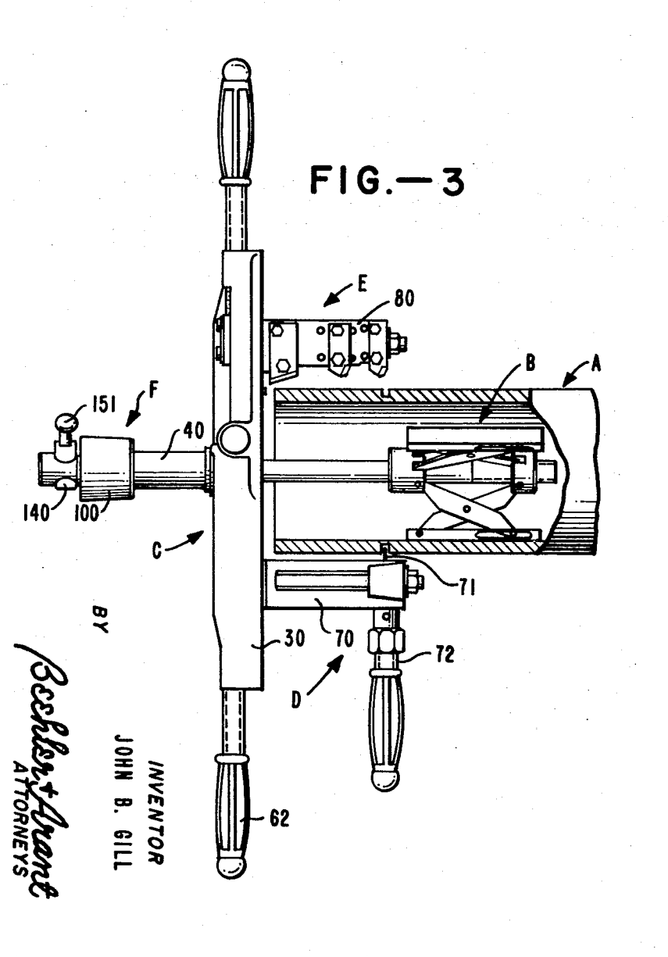
FIG. 3 is a top plan view of the tool and pipe, showing the pipe end in cross-section, as the cutting off of the pipe end is about to be completed.
Figure 4:
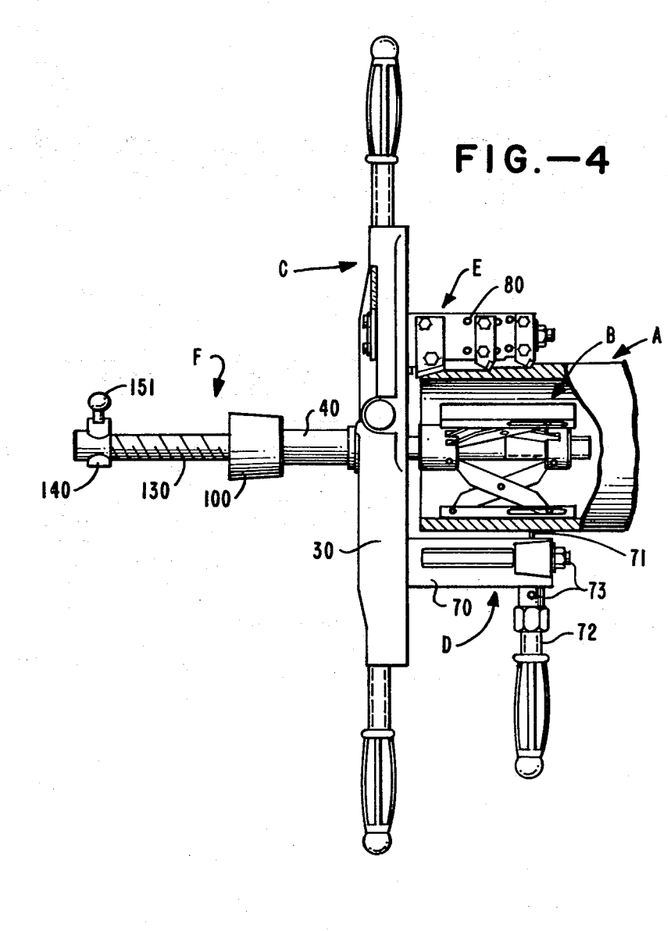
FIG. 4 is a top plan view of the tool and pipe, showing the pipe in cross-section, as the machining of the pipe and outer surface is being completed.

In one manner of use of the pipe tool the lock pin 150 is merely inserted into groove 21, so that the turning frame assembly C may rotate in place. This mode of operation is used for cutting off a short end section of the pipe, as illustrated in FIG. 3. The collet jaws may be disengaged and re-engaged at another location on the feed tube in order to accommodate to the pipe length to be cut. But if the trimmer tool assembly D is to be used in squaring off the exterior surface of the pipe to a true cylindrical configuration, or if the machining tool assembly E is to be used for its intended purpose, then progressive advancement of the turning frame assembly C toward the pipe end is required. In either of those instances the lock pin is placed in its alternate position (FIGS. 5, 25) so that it engages the hole 22 of the arbor shaft 20. The collet nut 100 is then turned by hand in order to tighten it, and rotation of the turning frame assembly causes it to advance relative to the arbor shaft.

One advantage of the invention is the easy replacement of wearing parts. The bearing 35 and collet jaws 110, 111 may be easily removed and replaced in the field without without taking the tool out of service. Other parts such as hub casting 40 with its septa 45 experience very little wear.

Figure 18:
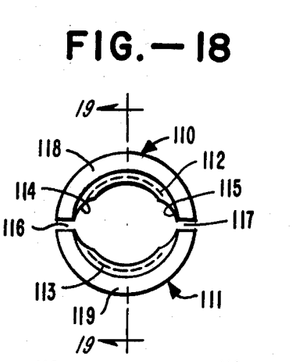
FIG. 18 is an outer end view of the collect jaws in their normally closed position.
Figure 19:
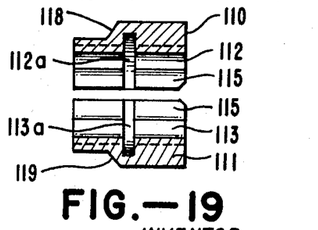
FIG. 19 is a cross-sectional view taken on the line 19—19 of FIG. 18.

Reference is made to FIGS. 18 and 19 showing the detailed construction of the collet jaws. The collet jaws are made from a single cylindrical sleeve member having internal threads (FIG. 18). First one end of the cylindrical member is ground down so as to form the camming surfaces 118, 119 which are near the longitudinal center of the sleeve member. The threads are removed from opposite sides of the member at 114, 115 by making circular grinds in the thread surface. Then a lateral saw cut is made which entirely removes the material at 116, 117. The result is a matched pair of collet jaws 110, 111 whose threads 112, 113 are aligned in the proper helical relationship while the ends of the collet jaws are flush with each other and the two jaws are concentric to a common longitudinal axis. The spring grooves 112a, 113a are then formed (FIG. 19).

It will be seen that the spring grooves are located at the longitudinal center of the collet jaws so as to provide a balanced opening and closing action. Another significant feature is that the camming surfaces 118, 119 are located very near to the spring grooves so that the closing action of the camming surfaces is exerted rather directly against the collet spring 120.

Frequent replacement of the collet jaws 110, 111 is not required because they can be used even after considerable wear has taken place. The septa 45 of hub member 40 are of the same thickness and configuration as the segments of material 116, 117 that were originally cut out of the collet jaws. Therefore, in the closed position of the jaws, such as shown in FIG. 5, the jaws are tight against the septa. After considerable use of the tool has taken place the threads become worn to some extent. The preferred procedure then is that the collet jaws are removed and are filed down at their ends, which corresponds to a widening of the spaces 116, 117. After this filing operation the collet jaws are reinserted and will then achieve substantially a full engagement with the threads of the feed tube, and the collet nut 100 simply tightens to a slightly tighter position than previously. This periodic filing of the ends of the collet jaws may be continued until a great deal of wear has taken place, or the collet jaw threads become significantly misaligned with the feed tube threads. Then a new pair of collet jaws are required.

Figures 6, 7, 24, 26, 27, 28, 29:
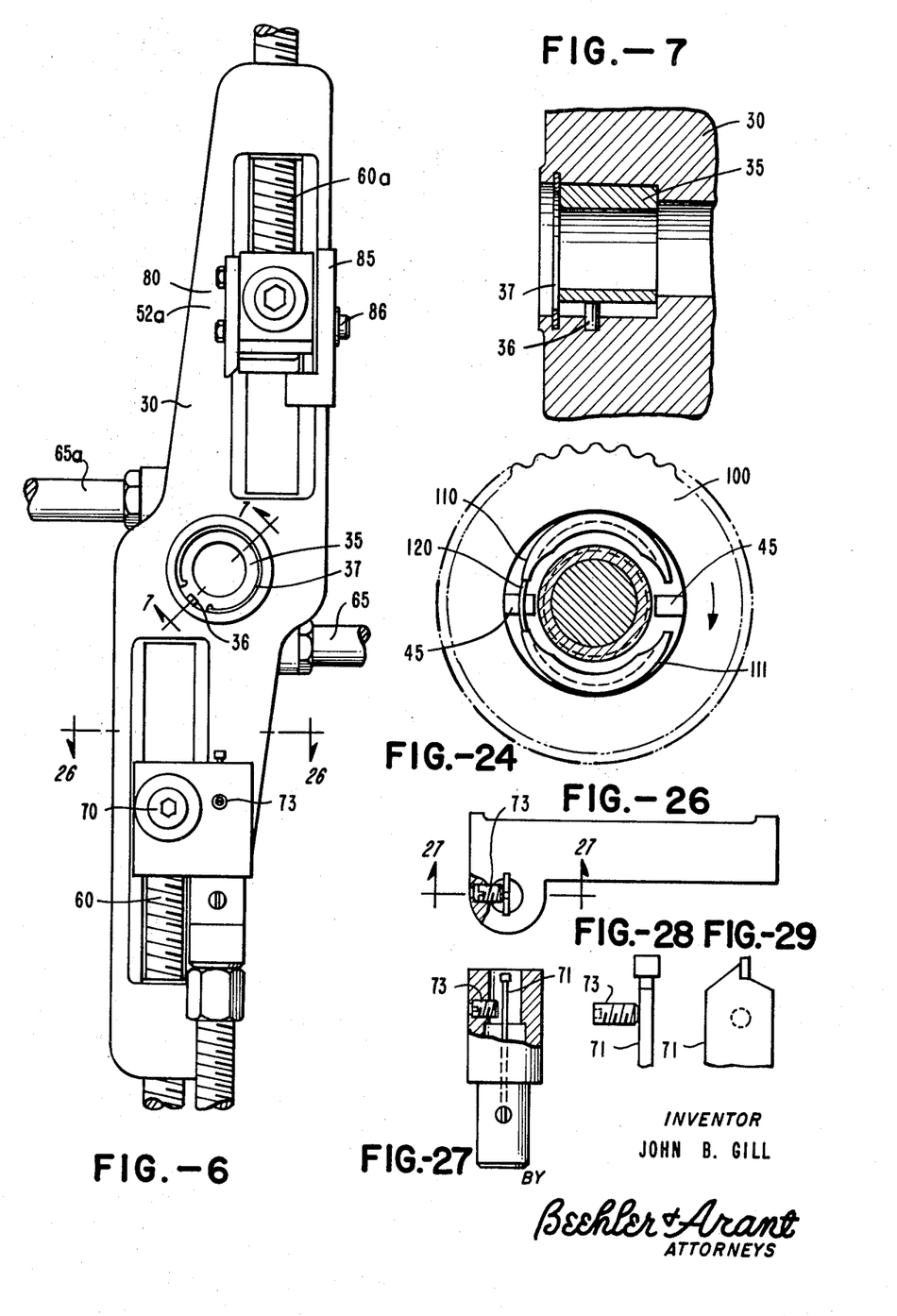
FIG. 6 is an elevation view of the turning frame taken from the inner end of the instrument with the arbor shaft removed, and showing the removable bearing support for the turning frame.
FIG. 7 is a cross-sectional view taken on the line 7—7 of FIG. 6 and showing the bearing details.
FIG. 24 is a transverse cross-sectional view of the collet nut, collet jaw chamber, and collet jaws like FIG. 20, but showing the collet jaws open.
FIG. 26 is a plan view of the trimming tool support arm and blade with the blade extended.
FIG. 27 is a cross-sectional view of the trimming blade and support arm showing both blade and set screw in retracted position.
FIG. 28 is an enlarged view, like 27, but showing the blade and set screw.
FIG. 29 is a side view of the blade end.
Figure 20:
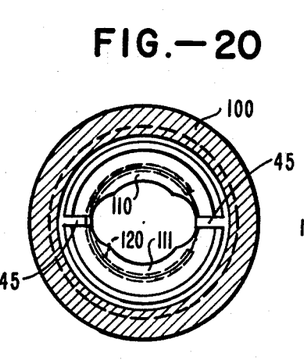
FIG. 20 is a transverse cross-sectional view of the collet nut taken on the line 20—20 of FIG. 5, but showing an end view of the collet assembly.

As shown in FIGS. 5 and 21 the length of the circumferential wall 43 of the collet chambers, and of the septa 45, is equal to the length of that portion of the collet jaws which lies forward of the spring grooves 112a, 113a. In both open and closed positions of the collet jaws the collet spring 120 lies just to the rear of the septa 45, as is shown in FIGS. 20 and 24.

Although the screw feed assembly has been illustrated as incorporated in a pipe tool it may also be used in other applications and for other purposes.

What is claimed is:
1. A pipe machining tool comprising, in combination:
a shaft adapted to be disposed within the end of a pipe and fixedly supported therefrom;
a turning frame rotatably supported from the protruding portion of said shaft, said turning frame hav- ing a pair of elongated, outwardly extending arms occupying a common plane and having respective radially extending slideways for supporting respective tools therefrom;

a first mounting block engaging the slideway of one of said arms, said first mounting block having a mounting frame attached thereto extending perpendicular to the plane of said turning frame and generally parallel to said shaft, said first mounting frame having a trimming tool attached thereto;

a second mounting block engaging said slideway of the other of said arms, said second mounting block having a second mounting frame attached thereto, said second mounting frame having a machining tool attached thereto;

first adjusting screw means carried by said turning frame for adjusting the radial position of said first mounting block, first mounting frame, and trimming tool relative to said shaft;

second adjusting screw means carried by said turning frame for adjusting the radial position of said second mounting block, second mounting frame, and machining tool relative to said shaft; and a machining tool stop consisting of a single plate member of such configuration as to form an elongated base plate having an elongated slideway formed therein, and a hook projecting laterally from one end of said base plate;

said hook being disposed beneath the radially inward side of said second mounting frame, and said base plate engaging said associated turning frame arm and extending radially thereon; and a depth stop screw passing through said slideway of said base plate and engaging a threaded opening in said turning frame arm;

whereby at any selected radial position of said second mounting frame, said hook may be brought in engagement therewith and said depth stop screw then tightened against said base plate, thereby facilitating the return of said machining tool to said same radial position at some later time, after having been removed to a more remote radial position during an intermediate period of time.

2. The apparatus claimed in claim 1 wherein said turning frame arm has two adjacent external surface portions disposed at substantially 90 degrees relative to each other, and wherein said hook of said depth stop is bent at an angle of approximately 90 degrees relative to said base plate, whereby both said hook and said base plate are in face-to-face engagement with the outer surfaces of corresponding portions of said turning frame arm.

3. The apparatus claimed in claim 1 wherein said depth stop screw is disposed at substantially the radial center of said turning frame arm, the slideway of said depth stop base member having a length which is greater than one-fourth the length of said turning frame arm.

4. A pipe machining tool comprising, in combination:
an arbor shaft;
an arbor assembly on one end of said shaft, adapted for insertion into the end of a pipe and for subsequent expansion so as to firmly support the shaft in an outwardly extending position concentric to the longitudinal axis of the pipe;
a turning frame assembly rotatably supported from said shaft, having outwardly extending arms occupying a common plane perpendicular to said shaft;
a trimming tool supported from one arm of said turning frame assembly;
a machining tool supported from another arm of said turning frame assembly;
said turning frame assembly additionally including separate means for selectively adjusting the radial position of each of said tools;
an externally threaded feed tube circumdisposed about said shaft on the side of said turning frame assembly that is disposed away from the pipe end;
an elongated hub member having a generally hollow cylindrical configuration, being circumdisposed about said feed tube and having one end thereof rigidly attached to said frame assembly to rotate therewith;
latch means cooperable with the outward ends of said shaft and said feed tube for latching said feed tube in a fixed position relative to said shaft;
said hub member on its outward end having a hollow cylindrical portion and an opposed pair of septa extending radially inwardly from the circumferential wall of said hollow cylindrical portion;
a pair of collet jaws disposed on respective sides of said septa, and being threaded on their internal surfaces for threaded engagement with said feed tube; and
a collet nut threadedly engageable with the outer end of said hub member, and having camming means cooperable with said collet jaws for forcing said collet jaws into engagement with said feed tube;
whereby rotation of said turning frame assembly relative to said shaft causes said hub member, collet nut, and collet jaws to advance as a unit relative to said shaft, feed tube, and latch means.

5. A pipe machining tool as claimed in claim 4 wherein said shaft has a circumferential groove formed on its outer end, and said latch means is selectively operable, in an alternate mode of operation, for engaging said circumferential groove so as to permit rotation of said feed tube relative to said shaft while preventing longitudinal movement thereof;
whereby as said turning frame assembly is rotated, said trimming tool may be advanced radially for cutting off an end portion of the pipe.

6. A tool as claimed in claim 4 which further includes means cooperable with said turning frame assembly for fastening said trimming tool in a selected position of radial adjustment, whereby said trimming tool may be used to cut the outer surface of the pipe end to a true cylindrical configuration.

7. A tool as claimed in claim 5 wherein said shaft has a transverse hole formed therein at the bottom of said circumferential groove, and said latch means includes a spring-loaded latch pin and selectively operable means for setting said latch pin to either a shallow position for occupying only said circumferential groove, or a deep position for occupying said transverse hole.

8. A tool as claimed in claim 4 which further includes a collet expansion spring consisting of a resilient member bent in an arcuate form and having a length somewhat less than 360 degrees, each of said collet jaws having a circumferentially extending groove formed in its inner wall intermediate its two ends, said grooves being longitudinally aligned, said expansion spring occupying said grooves so as to tend to keep said collet jaws out of engagement with the externally threaded surface of said feed tube.

9. A pipe machining tool as claimed in claim 4 wherein said septa are disposed in a plane that lies perpendicular to the plane of said turning frame arms.

10. A pipe machining tool comprising:
a shaft;
a frame assembly revoluble upon said shaft, having outwardly extending arms occupying a common plane perpendicular to said shaft, and at least one tool supported from one of said arms;
an elongated hub member having its forward end rigidly attached to said frame assembly to rotate therewith, the rearward end of said hub member having a collet jaw chamber formed therein;
a feed tube disposed about said shaft within said hub member, said feed tube being externally threaded and projecting rearwardly from said hub member;
latch means selectively operable for latching the rearward end of said feed tube in a fixed position relative to the rearward end of said shaft;

a pair of collet jaws disposed within said collet chamber for threadedly engaging said feed tube; and a collet nut having a threaded end engageable with external threads on said hub member and having an internal camming surface engageable with said collet jaws for forcing said collet jaws into engagement with said feed tube, thereby to cause said hub member, collet nut, and collet jaws to advance as a unit when rotated relative to said shaft, feed tube, and latch means.

11. A pipe machining tool as claimed in claim 10 wherein said collet jaw chamber is of a hollow cylindrical configuration having an opposed pair of septa extending radially inwardly from the circumferential wall thereof to separate said collet jaws, said septa being disposed in a plane that lies perpendicular to the plane of said frame assembly arms; said collet jaws being selectively disengageable from said feed tube and then re-engageable in a different longitudinal position thereon.

References Cited

UNITED STATES PATENTS

| | | | |
|---|---|---|---|
| 1,674,372 | 6/1928 | Nonneman | 83—4 |
| 2,595,541 | 5/1952 | Riordan | 82—4 |
| 2,916,955 | 12/1959 | Gill | 82—4 |
| 3,288,004 | 11/1966 | Brown et al. | 144—205 |

LEONIDAS VLACHOS, Primary Examiner

U.S. Cl. X.R.

144—205